United States Patent
Wicher

(10) Patent No.: US 6,608,150 B1
(45) Date of Patent: Aug. 19, 2003

(54) PREPARATION OF EXPANDABLE STYRENE POLYMERS

(75) Inventor: Jerome Wicher, Collegeville, PA (US)

(73) Assignee: ATOFINA Chemicals, Inc., Philadelphia, PA (US)

( * ) Notice: Subject to any disclaimer, the term of this patent is extended or adjusted under 35 U.S.C. 154(b) by 0 days.

(21) Appl. No.: 10/265,822

(22) Filed: Oct. 8, 2002

(51) Int. Cl.[7] .............................. C08F 2/18; C08F 4/38
(52) U.S. Cl. ..................... 526/73; 526/228; 526/346; 521/56; 521/60; 521/146
(58) Field of Search ................ 521/56, 60, 146; 526/228, 346, 73

(56) References Cited

U.S. PATENT DOCUMENTS

| | | | |
|---|---|---|---|
| 3,726,848 A | * 4/1973 | Squire et al. ................. | 521/56 |
| 4,029,869 A | 6/1977 | Ingram et al. ............... | 526/233 |
| 4,125,696 A | * 11/1978 | Kamath ........................ | 521/56 |
| 5,266,603 A | 11/1993 | Holzmeier ................... | 521/56 |
| 5,908,872 A | 6/1999 | Gluck et al. ................. | 521/146 |
| 6,046,245 A | 4/2000 | Gluck et al. ................. | 521/56 |
| 6,486,271 B1 | * 11/2002 | Sosa et al. .............. | 526/228 X |

OTHER PUBLICATIONS

Villalobos et al, JACS, 50, pp 327–343, 1993.

* cited by examiner

*Primary Examiner*—Fred Teskin
(74) *Attorney, Agent, or Firm*—William D. Mitchell

(57) ABSTRACT

Enhanced conversion rates are realized in a suspension polymerization process for styrene through the use of peroxide initiators having one hour half life temperatures from 101° to 111° C. are disclosed. Also disclosed are suitable initiator combinations which provide polymeric products with low residual monomer content at reduced process temperatures, polymerizable compositions containing such initiators and products produced by such processes and compositions.

10 Claims, No Drawings

PREPARATION OF EXPANDABLE STYRENE POLYMERS

BACKGROUND OF THE INVENTION

The present invention relates to processes defined in the art of chemistry as free radical initiated polymerization processes, more specifically to the free radical initiated polymerization of styrene monomers. Still more specifically, it relates to such processes for the polymerization of expandable styrene polymers ("expandable polystyrene"). It also relates to compositions of matter employed in such processes and to the compositions and articles of manufacture produced thereby.

The established method to produce expandable styrene polymers, generically designated as EPS, is by aqueous suspension polymerization. It is typically a batch process where two or more monomer-soluble polymerization initiators are used with a rising stepwise, continuous, or combination temperature profile. Initiators for the process are selected on the basis of their half life temperatures to provide a measured supply of radicals at selected points along the temperature profile such that effective conversion occurs within an acceptable period of time. For styrene polymerization, it is convenient to describe initiator decomposition performance in terms of one hour half life temperature, defined as that temperature sufficient to cause decomposition of one half the starting concentration of initiator over a one hour time period.

Traditionally, suspension polymerization to prepare EPS is conducted in a process using two different temperature stages and two initiators with different half life temperatures, each appropriate for the particular temperature stage. Dibenzoyl peroxide (BPO) is often used as the first stage initiator at a reaction temperature of about 82° to 95° C. Other first stage initiators useful in this temperature range might include tertiary butyl peroxy-2-ethylhexanoate, tertiary amyl peroxy-2-ethylhexanoate and 2,5-dimethyl-2,5-di(2-ethylhexanoylperoxy)hexane. Initiators such as tertiary butyl peroxybenzoate (TBP) or dicumyl peroxide (DCP) are widely used for the higher temperature stage at 115° to 135° C. The second stage is usually a finishing step intended to minimize residual monomer in the EPS. In commercial processing, this stage is often held above 125° C. for prolonged intervals to reduce monomer content to acceptable levels.

EPS, as prepared in the suspension process, is in the form of essentially spherical beads with typical diameters of approximately 0.2 mm to 2.0 mm. In order to render the beads "expandable", it is necessary to impregnate the polymer with a blowing agent, most often low molecular weight alkane hydrocarbons like butane, 2-methylbutane, pentane and cyclohexane. EPS can be prepared in a one-step process or a two-step process. The former allows blowing agent impregnation during the polymerization and has the obvious advantage of reduced polymer handling operations. The two-step process isolates the polymer beads and segregates by size prior to a separate impregnation operation. The advantage in this case is that of precise control of bead size, a more critical parameter in some polymer molding operations. Peroxide initiator concentrations used to expedite conversion in the present invention may readily be adjusted by one of ordinary skill in the art to accommodate either process.

Characteristic shortcomings of the traditional process are long reaction times necessary to obtain adequate conversion in the first stage and relatively high finishing temperatures required in the second stage. Initiators and their use conditions described in the present invention serve to address these deficiencies. Reduced conversion time offers obvious productivity benefits. Lower finishing temperatures may offer additional process advantages such as reduced oligomer content and reduced water content in the product polymer. Oligomers may contribute undesirable polymer properties and water incorporation may cause difficulties when fabricating EPS beads into molded articles. Reducing process temperature is also an increasingly important concern as energy costs rise.

There have been previous attempts to reduce reaction times for styrene suspension polymerizations. In U.S. Pat. No. 4,029,869, Ingram teaches a suspension polymerization process using difunctional monomer additives having asymmetrical reactivity to give more desirable distributions of molecular weight. Without such additives, higher temperature styrene suspension polymerization using tertiary butyl peroxybenzoate, while reducing conversion time, yields polymer with narrow molecular weight distribution (polydispersity index), unsuitable for polymer processing. The process of the present invention requires no such monomer additives to obtain suitable polydispersity.

U.S. Pat. No. 5,266,603 teaches use of the conventional two temperature stage process using at least two peroxide initiators having lower and higher initiation temperatures to obtain low residual benzene content employing particularly specified perketal and/or monoperoxycarbonate initiators as the higher temperature initiators. The particular peroxyketals specified are not "intermediate" half life temperature initiators such as are contemplated by the present invention and, in particular, the peroxy groups substituted on the aliphatic or cycloaliphatic chains of the perketals are limited to t-butyl peroxy groups. Such peroxy compounds and their close analogs are known to have a half life temperature outside the range for "intermediate" half life initiators as contemplated by the present invention.

In the Journal of Applied Polymer Science, Vol. 50, 327–343 (1993), Hamielec notes the generally recognized fact that styrene conversion rates for suspension polymerizations can be increased by elevating initiator concentration, but this causes unacceptably low molecular weight in the typical process. To overcome this circumstance, Hamielec resorts to somewhat higher temperatures and use of a symmetrical difunctional initiator with a one hour half life temperature of approximately 98° C. This improves conversion rate over BPO in a similar process and preserves much of the molecular weight. However, the process consumes a very substantial amount of the difunctional initiator and still appears to yield low polydispersity index. Also, no data is provided to assess effectiveness of the process to minimize residual monomer. The process of the present invention uses significantly lower concentrations of first stage initiators with one hour half life temperatures higher than that of BPO to more quickly obtain polymer of adequate molecular weight and relatively low residual monomer levels.

Glück et al. in U.S. Pat. Nos. 5,908,272 and 6,046,245, teaches the production of expandable styrene polymers using polymerization in aqueous suspension in the presence of two peroxides which decompose at different temperatures wherein the peroxide which decomposes at the higher temperature is multifunctional.

None of the above references teach or suggest the improvements provided by the present invention to the two temperature step process for the polymerization of styrene to produce expandable polystyrene.

OBJECTS OF THE INVENTION

An object of the present invention is to employ organic peroxide initiators included in a specific half life temperature range (optionally in combination with conventional peroxide initiators) to produce expandable styrene polymers at accelerated conversion rates.

Another object of the present invention is to use these specific organic peroxide initiators to obtain EPS resin with molecular weights suitable for typical EPS applications.

Another object of the present invention is to employ these specific organic peroxide initiators in a process with significantly reduced process finishing temperature while still obtaining relatively low (less than 1000 ppm) residual monomer levels in the final polymer.

SUMMARY OF THE INVENTION

The above objects have been realized by either partially or entirely replacing conventional peroxide initiators like BPO, TBP and DCP with peroxides whose one hour half life temperatures are higher than that of BPO but lower than that of TBP. Further, pairing such peroxides, defined for purposes of the present invention as "intermediate" temperature initiators, with co-initiators whose half life temperature differs by 5° to 15° C. maintains free radical concentrations at effective levels to significantly improve conversion. This invention contemplates that half life temperature measurements are determined by measuring the rate of initiator decomposition in the aromatic solvent cumene by periodically sampling solutions of the peroxide maintained at several selected constant temperatures and determining the amount of undecomposed peroxide remaining in the sampled solution by conventional iodometric titration techniques. Such half life measurement techniques are well known by those skilled in the art. Suitable techniques for determining such half life temperatures in the same solvent using differential scanning calorimetry which provide a direct measurement of the desired half life temperature are also known to those of skill in the art and may be substituted for the iodometric measurements. The two techniques provide equivalent results for the same solvent within the expected standard experimental deviation for the procedures. It is well known in the art that half life temperatures are dependent on the solvent in which the determination is made, thus,(for precision in comparing the half life temperature of one peroxide to another, the solvent in which the half life is determined must be specified.

Thus, the invention provides in its process aspect, an improved process for the polymerization of styrene monomer to produce expandable polystyrene wherein styrene is polymerized in a process comprising the following steps:

A. heating an aqueous suspension comprising styrene monomer and at least two organic peroxide initiators, one of said organic peroxide initiators having a lower one hour half life decomposition temperature and at least one other of said organic peroxide initiators having a higher one hour half life decomposition temperature, for a time and at a temperature sufficient to effect at least partial decomposition of said lower half life organic peroxide initiator and initiate polymerization of said styrene monomer, and B. subsequently raising the temperature of said aqueous suspension above the initial heating temperature to complete decomposition of the organic peroxide initiators in said suspension and provide complete polymerization of said styrene monomer, wherein the improvement comprises at least one of the organic peroxide initiators incorporated in said suspension being an "intermediate" temperature peroxide.

Since a significant number of both first stage and finishing peroxide initiators can be utilized to enhance conversion in the present invention, a range of conversion efficiency improvements is available, depending on the specific peroxides selected and the concentrations used in the process. Peroxide selection and use levels for this process may, advantageously, be based on the desired rate of conversion enhancement consistent with heat removal capability of any specific process equipment. Such considerations, which are well understood by those experienced in practicing commercial styrene polymerization and which will depend to some extent on the requirements of the individual apparatus being utilized in such production, will avoid undesirable conditions that yield unacceptable reaction products.

The invention provides in a first composition aspect, an improved aqueous suspension suitable for polymerization to provide expandable polystyrene, said suspension comprising styrene monomer and at least two organic peroxide initiators, one of said organic peroxide initiators having a lower one hour half life decomposition temperature and at least one other of said organic peroxide initiators having a higher one hour half life decomposition temperature, wherein the improvement comprises one of the organic peroxide initiators in said suspension being an "intermediate" temperature peroxide.

The invention provides in a second composition aspect, expandable polystyrene produced by the process aspect of the invention from the first composition aspect of the invention and containing the decomposition products of the "intermediate" temperature peroxide incorporated into said first composition aspect of the invention.

The invention provides in a third composition aspect, an article of manufacture comprising a formed, at least two dimensional, object produced by shaping the second composition aspect of the invention into said formed object by conventional means.

DETAILED DESCRIPTION OF THE INVENTION

Initiators used for effecting significant conversion enhancement in this process, as compared to the traditional process, are characterized by a specific half life temperature range which allows for higher process temperatures that notably improve the kinetics of styrene polymerization. Additionally, judicious selection of co-initiators for the process sustains such higher free radical concentrations to further increase styrene conversion rate. Thus, the combination of sufficient free radical concentrations at more favorable temperatures can dramatically enhance conversion rate over conventional, lower temperature processes.

It has been discovered that initiators with a one hour half life temperature range (as measured in the aromatic solvent cumene) of from 101° to 111° C. and, preferably, from 104° to 110° C., can substantially enhance conversion rate over typical suspension polymerization processes for styrene that use conventional first stage initiators of lower half life temperature like BPO, 2,5-dimethyl-2,5-di(2-ethylhexanoylperoxy)hexane or tertiary butyl peroxy-2-ethylhexanoate. For purposes of this discussion, as stated above, it is convenient to designate such initiators with a one hour half life temperature range of from 101° to 111° C. as "intermediate" temperature peroxides.

"Intermediate" temperature peroxides offer a unique advantage in styrene suspension polymerization applications in that they can perform either in a capacity as first stage initiator or in a capacity as finishing initiator. Selecting which performance capacity is most advantageous is largely a function of process equipment capability. Factors such as reactor heat load tolerance and post-reactor product handling capability will certainly influence the inherent application potential of "intermediate" temperature peroxides.

Obtaining such significantly enhanced conversion rates relative to that obtainable with conventional initiators involves partially or completely replacing BPO (or other first stage initiators with similar half life temperature) with an "intermediate" temperature peroxide initiator whose one hour half life temperature is from 101° to 111° C., approximately 7 to 17° C. higher than that of BPO (or other first stage initiators with similar half life temperature). These initiators are used at higher process temperatures which materially benefit conversion rates. The "intermediate" temperature peroxides can be utilized in amounts from 0.002 to 0.012 equivalents of initiator per liter of styrene and, more preferably, from 0.004 to 0.01 equivalents of initiator per liter of styrene.

Such "intermediate" temperature peroxides include, but are not limited to, 1,1,3,3-tetramethylbutyl (t-octyl) esters of alkaneperoxoic acids that are unsubstituted at the alpha position, 1,1,3,3-tetramethylbutyl (t-octyl) diesters of alkanediperoxoic acids that are unsubstituted at the alpha positions, and 1,1,3,3-tetramethylbutyl (t-octyl) esters of aroylperoxoic acids and 1,1,3,3-tetramethylbutyl (t-octyl) diesters of aroyldiperoxoic acids that are ring substituted in such manner as to result in a peroxide half life temperature within the described range. Other peroxides within the specified half life range are 1-alkoxy-1-t-alkylperoxycyclohexane, where the t-alkyl group contains 4 to 8 carbon atoms, including, without limitation, 1-alkoxy-1-t-amylperoxycyclohexane and 1-alkoxy-1-t-hexylperoxycyclohexane, where the alkoxy group contains 1 to 8 carbon atoms and the cyclohexane ring may optionally be substituted with 1 to 3 alkyl groups each, independently, having 1 to 3 carbon atoms.

Additional specific examples of these types of initiators are 1,1,3,3-tetramethylbutyl peroxyacetate (TOPA), 1,1,3,3-tetramethylbutyl peroxypropionate (TOPP), 1,1,3,3-tetramethylbutyl peroxy-3,5,5-trimethylhexanoate, di-(1,1,3,3-tetramethylbutyl)diperoxyadipate (DTODPA), 1,1,3,3-tetramethylbutyl peroxybenzoate (TOPB), di-1,1,3,3-tetramethylbutyl diperoxyterephthalate and 1-methoxy-1-t-amylperoxycyclohexane (TAPMC).

When "intermediate" temperature peroxides are employed as finishing initiators, it is most advantageous to select a co-initiator whose half life temperature is, approximately, 5° to 10° C. lower than that of the intermediate temperature peroxide used. Several non-limiting examples of useful peroxides which fall into the described half life temperature range lower than that of the "intermediate" temperature peroxides include tertiary butyl peroxy-2-methylpropanoate (TBPMP), tertiary amyl peroxy-2-methylpropanoate, tertiary butyl peroxycarbocyclohexane, tertiary amyl peroxycarbocyclohexane 1,4-di(tert-butylperoxycarbo)cyclohexane and 1,4-di(tert-amylperoxycarbo)cyclohexane. It will be obvious to one skilled in the art that there are numerous other peroxide initiators whose one hour half life temperatures are from about 5° to 10° C. lower than those of the "intermediate" temperature peroxides of this invention and that such other peroxides may also be similarly paired with the "intermediate" temperature peroxide initiators to enhance conversion rates.

If the "intermediate" temperature peroxide is employed as a first stage initiator, most advantage is gained by selecting a co-initiator whose half life temperature is, approximately, 5°–15° C. higher than that of the "intermediate" temperature peroxide used. Such judicious use of initiator pairs with the described temperature relationship allows for more continuous generation of free radicals than is typically seen with a single, conventional first stage initiator of lower half life temperature. Also, as a consequence of higher process temperatures used with the "intermediate" temperature peroxides of this invention, styrene conversion kinetics further improve to notably expedite the present process relative to a traditional process.

While it is, of course, entirely possible to use high temperature peroxides like TBP and/or DCP as second stage (finishing) initiators with the "intermediate" temperature peroxide initiators of this invention (one hour half life temperature from 101° to 111° C.), such use of TBP and/or DCP may preclude using lower finishing temperatures which can, beneficially, shorten process time. A number of both tertiary butyl (t-butyl) and tertiary amyl (t-amyl) finishing peroxides fall into a desirable one hour half life temperature range between 112° and 125° C. However, it is generally recognized that t-amyl peroxides (i.e., organic peroxides derived from t-amyl hydroperoxide) have superior performance over t-butyl peroxides for reducing residual monomer. Thus, preference is given to t-amyl peroxyesters and t-amyl monoperoxycarbonates falling into this preferred one hour half life temperature range between 112° and 125° C. for EPS processes mandating minimum residual monomer levels. More specifically, tertiary amyl esters of peroxyalkanoic acids that are unsubstituted at the alpha position, t-amyl esters of aroylperoxoic acids ring substituted in such manner as to result in a peroxide half life temperature within the described range and OO-t-amyl-O-alkyl monoperoxycarbonates are preferred as finishing peroxides for the present invention. Specific examples of useful t-amyl peroxyesters are t-amyl peroxyacetate, t-amyl peroxypropionate and t-amyl peroxybenzoate. Specific examples of useful t-amyl monoperoxycarbonates are OO-t-amyl O-2-ethylhexyl monoperoxycarbonate (TAEC) and OO-t-amyl O-isopropyl monoperoxycarbonate (TAIC). Analogous higher t-alkyl derivatives (such as t-hexyl or t-heptyl) of these peroxyesters and monoperoxycarbonates would likewise be effective as finishing initiators, however, the amyl derivatives are, presently, more economical. These cited examples are illustrative and not intended to limit the scope of useful initiators for the finishing stage of the present process. Numerous combinations of finishing peroxides may also be used advantageously in the present process to reduce residual monomer level in the product polymer at lower process temperatures than would ordinarily be used with TBP and/or DCP.

Organic peroxides used as finishing initiators in the present process and having one hour half life temperatures from 112° to 125° C. can be utilized in amounts from 0.00 to 0.01 equivalents of peroxide initiator per liter of styrene and, more preferably, from 0.002 to 0.006 equivalents of peroxide initiator per liter of styrene.

To minimize the possibility of generating benzene as a by-product of initiator decomposition, numerous embodiments of this invention can also usefully employ initiators having no aromatic nucleus. For example, essentially any 1,1,3,3-tetramethylbutyl peroxyalkanoate unsubstituted at the alpha position could be coupled with, essentially, any OO-t-alkyl-O-alkyl monoperoxycarbonate. A specific example of such an initiator combination that would be unlikely to produce benzene as a result of initiator decomposition is TOPA and TAEC.

Styrene is the preferred monomer for the process. However, up to 15% of the weight of styrene may be replaced by other ethylenically unsaturated monomers such as alkylstyrenes, alpha methylstyrene, acrylic acid esters and acrylonitrile. The process of the invention can be used with styrene to water ratios which can, typically, vary from about 0.3 to 1.5 parts by weight styrene per 1.0 part by weight water.

Other common and useful additives for the present suspension process include inorganic suspension stabilizers like calcium phosphate or magnesium pyrophosphate, organic suspension stabilizers like polyvinylpyrrolidone, polyvinyl alcohol or hydroxyethylcellulose, surfactants, blowing agents, chain transfer agents, nucleating agents, expansion aids, lubricants and plasticizers. Halogenated organic compounds (such as hexabromocyclododecane) are also particularly useful as flame retardant additives in this process. Such halogenated organic compounds are usually employed together with free radical generating synergists like bicumyl and dicumyl peroxide (DCP). Lower finishing temperatures, obtainable in specific embodiments of the present process, advantageously limit the degradation of such synergists. Blowing agents can be added before or at any time during the polymerization in amounts of up to 10 weight percent based on weight of charged monomer. Also useful for the present process is conducting the polymerization in the presence of up to 10 weight percent (based on monomer) of finely divided graphite particles using procedures similar to those described in U.S. Pat. No. 6,046,245 and references cited therein.

It is recognized that supplemental amounts of other peroxides with one hour half life temperatures between 80° and 125° C. may, optionally, be used to advantageously modify molecular weight and/or molecular weight distribution (polydispersity index) of the resulting polymer without substantial effect on the conversion enhancement inherent to the present process.

Measurement of molecular weight, molecular weight averages and the distribution of molecular weights (polydispersity) are well known in the art. U.S. Pat. No. 4,777,230, for example provides a discussion of the techniques in relation to acrylic coatings where narrow polydispersity is desired. One of skill in the art will understand that with suitable modification for the desired difference in polydispersity of the styrene polymers contemplated as being produced by the present invention, the general principles in that discussion will apply herein.

The following examples further illustrate the best mode contemplated by the inventor for the practice of the invention and are intended as illustrative only and not as limiting.

EXAMPLE A

Polymerization in Sealed Ampoules

Preliminary investigations of comparative (styrene) conversion rates using the present primary initiators were performed in ampoule polymerizations. Table I illustrates results typifying conversion enhancement obtainable with initiators of the present process. Peroxide concentration is given both in parts per million by weight relative to monomer and in parts per million active oxygen, also relative to monomer weight. Temperature profiles for the three reactions were:

BPO: isothermal @90° C.
BPO/TAEC; 90° C./4 hr, 115° C./2 hr
TOPA/TAEC: 112° C./2 hr 35 min, 115C./2 hr 25 min.

TABLE I

AMPOULE POLYMERIZATION OF STYRENE: CONVERSION DATA

| PEROXIDE(S) | CONC (ppm) | A[O] ppm | PERCENT CONVERSION | | | |
|---|---|---|---|---|---|---|
| | | | 3 HRS | 4 HRS | 5 HRS | 6 HRS |
| BPO | 2500 | 165 | — | 73.5 | 80.6 | — |
| BPO | 2500 | 165 | — | — | — | 82.8 |
| TAEC | 635 | 39 | | | | |
| TOPA | 1200 | 102 | 98.9 | — | — | — |
| TAEC | 800 | 49 | | | | |

The above tabulated results indicate that TOPA as primary initiator in combination with TAEC as finishing initiator affords unexpected, dramatically faster conversion than a BPO-initiated polymerization despite the latter's higher total peroxide activity. While results from bulk ampoule polymerizations may not be an exact representation of results obtained under actual suspension conditions, a reasonably good correlation is usually found.

The best mode of practicing the present process using "intermediate" temperature peroxide initiators whose one hour half life temperature is between 101° and 111° C. is further illustrated and compared in the following additional examples which are, also, not intended to limit the scope of the present invention.

EXAMPLE 1

Comparison

Into a 4 liter stirred pressure vessel was added 1300 g of styrene monomer, 1900 g of deionized water and 10.25 g of tricalcium phosphate. The mixture was heated to 50° C. at which temperature was added 0.021 g of potassium persulfate dissolved in 50 g of deionized water. The blend was heated to 90° C. at which temperature was added a mixture of 3.41 g of benzoyl peroxide (BPO) and 0.87 g of tertiary butyl peroxybenzoate (TBP) dissolved in 64 g of styrene monomer. Heating at 90° C. was continued for an additional 6.5 hours. To the mixture was then added 1.82 g of a 3% aqueous solution of sodium dodecylbenzenesulfonate. The reactor was sealed, heated to 115° C. and held at this temperature for 2 hours. The reaction mixture was then cooled and acidified with 42.5 ml of 6N HCl to isolate the beaded polymer product with Mw 310,000, Mw/Mn 3.02 and 278 ppm residual monomer.

EXAMPLE 2

Comparison

Into a 4 liter stirred pressure vessel was added 1300 g of styrene monomer, 1900 g of deionized water and 10.25 g of tricalcium phosphate. The mixture was heated to 50° C. at which temperature was added 0.021 g of potassium persulfate dissolved in 50 g of deionized water. The blend was heated to 90° C. at which temperature was added a mixture of 2.73 g of benzoyl peroxide (BPO), 0.989 g t-butyl peroxy-2-methylpropanoate (TBPMP) and 1.160 g of OO-t-amyl O-2-ethylhexyl monoperoxycarbonate (TAEC) dissolved in 64 g of styrene monomer. Heating at 90° C. was continued for six hours. To the mixture was then added 1.82 g of a 3% aqueous solution of sodium dodecylbenzenesulfonate in 150 ml water. The mixture was then heated to 114° C. (over a 20 minute period) and held at 114° C. for 1 hour and then held at 115° C. for 1 hour. The reaction mixture was then cooled to 60° C. and acidified with 42.5 ml of 6N HCl. Polymer (beads) was isolated with Mw 280,600, Mw/Mn 3.00 and 27 ppm residual monomer.

EXAMPLE 3

Comparison

Styrene monomer (1300 g), deionized water (1900 g) and tricalcium phosphate (7.00 g) were introduced into a 4 liter, stirred pressure vessel. After this mixture was heated to 50° C., potassium persulfate (0.015 g) dissolved in deionized water (50 g) was added to it. This mixture was then heated to 90° C. and benzoyl peroxide (3.41 g) was added in addition to OO-t-amyl O-2-ethylhexyl monoperoxy carbonate (TAEC) (1.023 g) dissolved in styrene monomer (64 g) and the heating at 90° C. continued for 5.5 hours. Deionized water (200 ml) was then added and heating of the mixture continued at 108° C. for 2 hours. At this time, the reaction mixture was cooled and 6N HCl (29 ml) added. The polymer in the form of beads was isolated in conventional fashion. Mw was 294,000, Mw/Mn 2.97 and residual monomer 64 ppm.

EXAMPLE 4

Into a 4 liter stirred pressure vessel was added 1300 g of styrene monomer, 1900 g of deionized water and 10.25 g of tricalcium phosphate. The mixture was heated to 50° C. at which temperature was added 0.021 g of potassium persulfate dissolved in 50 g of deionized water. The blend was heated to 90° C. at which temperature was added a mixture of 2.73 g of benzoyl peroxide (BPO), 0.989 g t-butyl peroxy-2-methylpropanoate and 0.839 g of 1,1,3,3-tetramethylbutyl peroxyacetate (TOPA) dissolved in 64 g of styrene monomer. Heating at 90° C. was continued for six hours. To the mixture was then added 1.82 g of a 3% aqueous solution of sodium dodecylbenzenesulfonate in 150 ml water. The mixture was then heated at 110° C. to 112° C. for 2 hours. The reaction mixture was then cooled to 60° C. and acidified with 42.5 ml of 6N HCl. Polymer (beads) was isolated with Mw 277,400, Mw/Mn 3.09 and 19 ppm residual monomer.

EXAMPLE 5

Into a 4 liter stirred pressure vessel was added 1300 g of styrene monomer, 1900 g of deionized water and 10.25 g of tricalcium phosphate. The mixture was heated to 50° C. at which temperature was added 0.021 g of potassium persulfate dissolved in 50 g of deionized water. The blend was heated to 90° C. at which temperature was added a mixture of 1.64 g of 1,1,3,3-tetramethylbutyl peroxyacetate (TOPA) and 1.09 g of OO-t-amyl O-2-ethylhexyl monoperoxycarbonate (TAEC) dissolved in 64 g of styrene monomer. The reactor was sealed, heated to 109° C. and held at this temperature for 1 hour. Further heating was done at 110° C. for 1.5 hours. To the mixture was then added 1.82 g of a 3% aqueous solution of sodium dodecylbenzenesulfonate. The reactor was then heated to 115° C. and held at this temperature for 2 hours. The reaction mixture was then cooled and acidified with 42.5 ml of 6N HCl to isolate the beaded polymer product with Mw 364,000, Mw/Mn 2.85 and 390 ppm residual monomer.

EXAMPLE 6

Into a 4 liter stirred pressure vessel was added 1500 g of styrene monomer, 1700 g of deionized water and 11.93 g of tricalcium phosphate. The mixture was heated to 50° C. at which temperature was added 0.025 g of potassium persulfate dissolved in 50 g of deionized water. The blend was heated to 90° C. at which temperature was added a mixture of 2.004 g of 1,1,3,3-tetramethylbutyl peroxyacetate (TOPA) and 1.432 g of OO-t-amyl O-2-ethylhexyl monoperoxycarbonate (TAEC) dissolved in 91 g of styrene monomer. The reactor was sealed and heated to 111° C. The temperature was then ramped to 112° C. over a period of 1 hour and 20 minutes. This temperature was then held for an additional 1 hour and 35 minutes. To the mixture was then added 2.12 g of a 3% aqueous solution of sodium dodecylbenzenesulfonate in 100 ml of water. The mixture was then heated to 115° C. (over a 20 minute period) and held at 115° C. for 1 hour and 45 minutes. The reaction mixture was then cooled to 60° C. and acidified with 49 ml of 6N HCl. Polymer (beads) was isolated with Mw 311,000, Mw/Mn 2.70 and 36 ppm residual monomer.

EXAMPLE 7

Into a 4 liter stirred pressure vessel was added 1300 g of styrene monomer, 1900 g of deionized water and 10.25 g of tricalcium phosphate. The mixture was heated to 50° C. at which temperature was added 0.021 g of potassium persulfate dissolved in 50 g of deionized water. The blend was heated to 90° C. at which temperature was added a mixture of 1.64 g of 1,1,3,3-tetramethylbutyl peroxyacetate (TOPA), 1.09 g of OO-t-amyl O-2-ethylhexyl monoperoxycarbonate (TAEC) and 0.27 g of t-amyl peroxybenzoate (TAP) dissolved in 64 g of styrene monomer. The reactor was sealed, heated to 110° C. and held at this temperature for 0.5 hour. Further heating was done at 111° C. for 1 hour, 112° C. for 1.5 hours 114° C. 0.75 hours and, finally, heated to and held at 120° C. for 1 hour. The reaction mixture was then cooled and acidified with 42.5 ml of 6N HCl to isolate the beaded polymer product with Mw 312,000, Mw/Mn 2.73 and 68 ppm residual monomer.

EXAMPLE 8

Into a 4 liter stirred pressure vessel was added 1300 g of styrene monomer, 1900 g of deionized water and 10.25 g of tricalcium phosphate. The mixture was heated to 50° C. at which temperature was added 0.021 g of potassium persulfate dissolved in 50 g of deionized water. The blend was heated to 90° C. at which temperature was added a mixture of 1.76 g of 1,1,3,3-tetramethylbutyl peroxypropionate (TOPP), 1.09 g of OO-t-amyl O-2-ethylhexyl monoperoxycarbonate (TAEC) and 0.27 g of t-amyl peroxybenzoate (TAP) dissolved in 64 g of styrene monomer. The reactor was sealed, heated to 112° C. and held at this temperature for 2 hours. Further heating was done at 115° C. for 0.33 hour and 100° C. for 3 hours. The reaction mixture was then cooled and acidified with 42.5 ml of 6N HCl to isolate the beaded polymer product with Mw 336,000, Mw/Mn 2.73 and 850 ppm residual monomer.

EXAMPLE 9

Into a 4 liter stirred pressure vessel was added 1300 g of styrene monomer, 1900 g of deionized water and 10.25 g of tricalcium phosphate. The mixture was heated to 50° C. at which temperature was added 0.021 g of potassium persulfate dissolved in 50 g of deionized water. The blend was heated to 90° C. at which temperature was added a mixture of 2.18 g of 1,1,3,3-tetramethylbutyl peroxybenzoate (TOPB), 1.09 g of OO-t-amyl O-2-ethylhexyl monoperoxycarbonate (TAEC) and 0.27 g of t-amyl peroxybenzoate (TAP) dissolved in 64 g of styrene monomer. The reactor was sealed, heated to 112° C. and held at this temperature for 2 hours. Further heating was done at 115° C. for 2.75 hours and 116° C. for 0.42 hours. The reaction mixture was then cooled and acidified with 42.5 ml of 6N HCl to isolate the beaded polymer product with Mw 311,000, Mw/Mn 2.51 and 202 ppm residual monomer.

EXAMPLE 10

Into a 4 liter stirred pressure vessel was added 1300 g of styrene monomer, 1900 g of deionized water and 10.25 g of tricalcium phosphate. The mixture was heated to 50° C. at which temperature was added 0.021 g of potassium persulfate dissolved in 50 g of deionized water. The blend was heated to 90° C. at which temperature was added a mixture of 1.912 g of t-butyl peroxy-2-methylpropanoate (TBPMP) and 1.125 g of 1,1,3,3-tetramethylbutyl peroxyacetate (TOPA) dissolved in 64 g of styrene monomer. The reactor was sealed and heated to 100° C. The temperature was then ramped to 102° C. over a period of 1 hour. This temperature was then held for an additional 2 hours and 45 minutes. The mixture was then heated to 108° C. and held at 108° C. for 1 hour. To the mixture was then added 1.82 g of a 3% aqueous solution of sodium dodecylbenzenesulfonate. The reactor was then heated to 112° C. and held at this temperature for 1 hour. The reaction mixture was then cooled to 60° C. and acidified with 42.5 ml of 6N HCl to isolate the beaded polymer product with Mw 308,000, Mw/Mn 2.84 and 1.29 percent residual monomer.

EXAMPLE 11

Into a 4 liter stirred pressure vessel was added 1300 g of styrene monomer, 1900 g of deionized water and 10.23 g of tricalcium phosphate. The mixture was heated to 50° C. at which temperature was added 0.021 g of potassium persulfate dissolved in 50 g of deionized water. The blend was heated to 90° C. at which temperature was added a mixture of 2.073 g of 1-t-amylperoxy-1-methoxycyclohexane (TAPMC) and 1.200 g of OO-t-amyl O-2-ethylhexyl monoperoxycarbonate (TAEC) dissolved in 64 g of styrene monomer. The reactor was sealed and heated to 111° C. The temperature was then ramped to 112° C. over a period of 1 hour. This temperature was then held for an additional 1 hour and 30 minutes. To the mixture was then added 1.82 g of a 3% aqueous solution of sodium dodecylbenzenesulfonate. Heating was continued at 112° C. for another 25 minutes. The mixture was then heated to 115° C. and held at 115° C. for 2 hours. The reaction mixture was then cooled to 60° C. and acidified with 42.5 ml of 6N HCl. Polymer (beads) was isolated with Mw 278,000, Mw/Mn 2.71 and 603 ppm residual monomer.

EXAMPLE 12

Into a 4 liter stirred pressure vessel was added 1300 g of styrene monomer, 1900 g of deionized water and 10.25 g of tricalcium phosphate. The mixture was heated to 50° C. at which temperature was added 0.021 g of potassium persulfate dissolved in 50 g of deionized water. The blend was heated to 90° C. at which temperature was added a mixture of 1.838 g of di-1,1,3,3-tetramethylbutyl diperoxyadipate (DTODPA) and 1.200 g of OO-t-amyl O-2-ethylhexyl monoperoxycarbonate (TAEC) dissolved in 64 g of styrene monomer. The reactor was sealed and heated to 111° C. The temperature was then ramped to 112° C. over a period of 1 hour and 20 minutes. This temperature was then held for an additional 1 hour and 35 minutes. To the mixture was then added 1.82 g of a 3% aqueous solution of sodium dodecylbenzenesulfonate. The mixture was then heated to 115° C. (over a 20 minute period) and held at 115° C. for 1 hour and 45 minutes. The reaction mixture was then cooled to 60° C. and acidified with 42.5 ml of 6N HCl. polymer (beads) was isolated with Mw 359,000, Mw/Mn 2.71 and 599 ppm residual monomer.

The data from Examples 1 to 12 is summarized below in Table 2 for convenience in comparison.

TABLE 2

DATA SUMMARY FOR EXAMPLES 1 TO 11

| Example | Initiator(s) | Reaction Time (hr) | Max Temp (deg. C.) | Mw/1000 | Mw/Mn | Residual Styrene (ppm) |
|---|---|---|---|---|---|---|
| 1 comp. | BPO TBP | 8.50 | 115 | 310 | 3.02 | 278 |
| 2 comp. | BPO TBPMP TAEC | 8.0 | 115 | 281 | 3.00 | 27 |
| 3 comp. | BPO TAEC | 7.5 | 108 | 294 | 2.97 | 64 |
| 4 inv. | BPO TBPMP TOPA | 8.0 | 112 | 277 | 3.09 | 19 |
| 5 inv. | TOPA TAEC | 4.50 | 115 | 364 | 2.85 | 390 |
| 6 inv. | TOPA TAEC | 5.0 | 115 | 311 | 2.70 | 36 |
| 7 inv. | TOPA TAEC TAP | 4.75 | 120 | 312 | 2.73 | 68 |
| 8 inv. | TOPP TAEC TAP | 5.30 | 115 | 336 | 2.73 | 850 |
| 9 inv. | TOPB TAEC TAP | 5.20 | 116 | 311 | 2.51 | 202 |
| 10 inv. | TBPMP TOPA | 6.0 | 112 | 308 | 2.84 | 12,900 |

TABLE 2-continued

DATA SUMMARY FOR EXAMPLES 1 TO 11

| Example | Initiator(s) | Reaction Time (hr) | Max Temp (deg. C.) | Mw/1000 | Mw/Mn | Residual Styrene (ppm) |
|---|---|---|---|---|---|---|
| 11 inv. | TAPMC TAEC | 5.0 | 115 | 278 | 2.71 | 603 |
| 12 inv. | DTODPA TAEC | 5.0 | 115 | 359 | 2.71 | 599 |

The molecular weight obtained with a variety of t-octyl initiators and t-amyl finishing peroxides (EX. 4 through 12) is comparable to that obtained with BPO/TBP (EX. 1), BPO/TBPMP/TAEC (EX. 2) and BPO/TAEC (EX. 3). Examples 1,2 & 3 are typical of conventional EPS processing conditions that require relatively long reaction times. The reaction conditions used for Examples 4 through 12 were not optimized, yet clearly demonstrate that it is possible to achieve comparable polymer molecular weights in significantly shorter reaction times and with residual monomer levels often lower than that obtained in a process using traditional initiators like BPO (examples 1, 2 & 3). Example 12 yields somewhat higher than typical molecular weight; this is an anticipated consequence of the first stage peroxide (DTODPA) being a deperoxide.

I claim:

1. An improved process for the polymerization of styrene monomer to produce expandable polystyrene wherein styrene is polymerized in a process comprising the following steps:

A. heating an aqueous suspension comprising styrene monomer and at least two organic peroxide initiators, one of said organic peroxide initiators having a lower one hour half life decomposition temperature and at least one other of said organic peroxide initiators having a higher one hour half life decomposition temperature, for a time and at a temperature sufficient to effect at least partial decomposition of said lower half life organic peroxide and initiate polymerization of said styrene monomer, and B. subsequently raising the temperature of said aqueous suspension above the initial heating temperature to complete decomposition of the organic peroxide initiators in said suspension and provide complete polymerization of said styrene monomer, wherein the improvement comprises at least one of the organic peroxide initiators incorporated in said suspension being an "intermediate" temperature peroxide.

2. A process as defined in claim 1 in which styrene is polymerized in aqueous suspension at between 80 and 135 degrees Centigrade for up to 10 hours in the presence of at least two organic peroxide initiators where at least one organic peroxide initiator is an "intermediate" temperature peroxide, has a half life period of 1 hour at from 101° to 111° C. as measured in cumene, and additional organic peroxides present have a half life period of 1 hour, as measured in cumene, at other than from 101 to 111° C.

3. A process as defined in claim 1 wherein the styrene monomer to be polymerized also contains up to about 15 weight %, based on styrene, of copolymerizable monomers.

4. A process as defined in claim 1 wherein the "intermediate" temperature peroxide has a half life period of 1 hour from 101° to 111° C. as measured in cumene and is selected from the group consisting of 1,1,3,3-tetramethylbutyl esters of alkaneperoxoic acids that are unsubstituted at the alpha position and 1,1,3,3-tetramethylbutyl esters of aroylperoxoic acids that are ring substituted in any manner as to result in a one hour half life temperature within this temperature range, 1-alkoxy-1-t-alkylperoxycyclohexanes in which the t-alkylperoxy group contains 4-8 carbons, the alkoxy group contains 2–5 carbons and the cyclohexane may be substituted with up to 3 alkyl groups independently having 1–3 carbon atoms each, or mixtures thereof.

5. A process as defined in claim 4 wherein the 1,1,3,3-tetramethylbutyl esters of alkaneperoxoic acids that are unsubstituted at the alpha position and 1,1,3,3-tetramethylbutyl esters of aroylperoxoic acids are selected from 1,1,3,3-tetramethylbutyl peroxyacetate (TOPA), 1,1,3,3-tetramethylbutyl peroxypropionate (TOPP), 1,1,3,3-tetramethylbutyl peroxy-3,5,5-trimethylhexanoate, di-1,1,3,3-tetramethylbutyl diperoxyadipate, 1,1,3,3-tetramethylbutyl peroxybenzoate (TOPB), di-1,1,33-tetramethylbutyl diperoxyterephthalate (DTODPA) and 1-methoxy-1-t-mylperoxycyclohexane(TAPMC) and where additional peroxides having a half life period of 1 hour at other than from 101° to 111° C., are selected from tertiary butyl, tertiary amyl or tertiary hexyl esters of peroxyalkanoic acids that are unsubstituted at the alpha position, t-butyl, t-amyl or t-hexyl esters of unsubstituted or ring-substituted aroylperoxoic acids, OO-t-butyl-O-alkyl monoperoxycarbonates, OO-t-amyl-O-alkyl monoperoxycarbonates, OO-t-hexyl-O-alkyl monoperoxycarbonates and OO-t-octyl-O-alkyl monoperoxycarbonates.

6. A process as defined in claim 5 wherein the tertiary amyl esters of peroxyalkanoic acids that are unsubstituted at the alpha position, t-amyl esters of unsubstituted or ring-substituted aroylperoxoic acids and OO-t-amyl-O-alkyl monoperoxycarbonates are selected from t-amyl peroxyacetate, t-amyl peroxypropionate, t-amyl peroxybenzoate, OO-t-amyl O-2-ethylhexyl monoperoxycarbonate (TAEC) and OO-t-amyl O-isopropyl monoperoxycarbonate (TAIC).

7. A process as defined in claim 1 wherein the styrene polymer so produced contains a blowing agent.

8. A process as defined in claim 7 wherein the blowing agent is added to the aqueous suspension after process step A.

9. A process as defined in claim 7 wherein the blowing agent is added to the styrene polymer obtained and isolated after process step B.

10. An improved aqueous suspension suitable for polymerization to provide expandable polystyrene, said suspension comprising styrene monomer and at least two organic peroxide initiators, one of said organic peroxide initiators having a lower one hour half life decomposition temperature and at least one other of said organic peroxide initiators having a higher one hour half life decomposition temperature, wherein the improvement comprises one of the organic peroxide initiators in said suspension being an "intermediate" temperature peroxide.

* * * * *